(12) United States Patent
Godoy et al.

(10) Patent No.: US 8,812,408 B2
(45) Date of Patent: Aug. 19, 2014

(54) MAPPING METHOD AND SYSTEM

(75) Inventors: Glenn C. Godoy, Endwell, NY (US);
Marco Antonio Marquez Gomez, Beacon, NY (US); Gautam Majumdar, Wappingers Falls, NY (US); Terrence Lee Woodnorth, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1824 days.

(21) Appl. No.: 11/757,148

(22) Filed: Jun. 1, 2007

(65) Prior Publication Data

US 2008/0300892 A1 Dec. 4, 2008

(51) Int. Cl.
*G06Q 10/10* (2012.01)
*G06Q 10/06* (2012.01)
*G06Q 30/08* (2012.01)
*G06Q 10/00* (2012.01)
*G06Q 30/02* (2012.01)

(52) U.S. Cl.
CPC ................................ *G06Q 10/1053* (2013.01)
USPC ............................. 705/321; 705/1.1; 705/320

(58) Field of Classification Search
CPC .......................... G06Q 10/1053; G06Q 10/105
USPC .......................................... 705/321, 320, 1.1
See application file for complete search history.

(56) References Cited

U.S. PATENT DOCUMENTS

| | | |
|---|---|---|
| 6,311,164 B1 | 10/2001 | Ogden |
| 6,370,510 B1 | 4/2002 | McGovern et al. |
| 6,385,620 B1 | 5/2002 | Kurzius et al. |
| 6,662,194 B1 | 12/2003 | Joao |
| 7,080,057 B2 | 7/2006 | Scarborough et al. |
| 2003/0145016 A1* | 7/2003 | Bello et al. ................. 707/104.1 |
| 2004/0260601 A1* | 12/2004 | Brief ............................... 705/11 |
| 2004/0267606 A1* | 12/2004 | Brishke et al. .................. 705/11 |
| 2007/0124196 A1* | 5/2007 | Brief et al. ...................... 705/11 |

* cited by examiner

*Primary Examiner* — Jonathan Ouellette
(74) *Attorney, Agent, or Firm* — Schmeiser, Olsen & Watts; Lisa J. Ulrich

(57) ABSTRACT

A mapping method and system. The method includes receiving from a computing system, a selection of a first candidate skill from a list of candidate skills. The computing system receives a selection of a first work location of associated with a first skill. The computing system determines a first geographical location identifier identifying a first area comprising the first work location. The computing system determines a first work region comprising the first area and the first work location. The computing system selects a first group of suppliers associated the first work region. The computing system generates a candidate request document comprising the first candidate skill, the first work region, and the first work location. The computing system transmits to the first group of suppliers the candidate request document.

40 Claims, 9 Drawing Sheets

Skill detail for skill request

Complete the appropriate fields below and click "Continue" button to proceed.

| Primary job role | |
|---|---|
| * Primary job category: ☐ | Information Technology and Services ▽ |
| * Secondary job category: ☐ | IT Specialist ▽ |
| * Job role ☐ | IT Specialist ▽ |

| Work location | |
|---|---|
| Specify the location where the work will be performed. | |
| * Work will be performed at: ☐ | ○ Company location |
| | ⦿ Other (e.g., customer location, remote office, etc.) |
| Country/Territory | United States |
| * State/Region/Province: | California ▽ |

| Position details | |
|---|---|
| Provide Details about the resource requirement. | |
| Will this request be fulfilling a new requirement?: | ○ Yes – this is a new requirement. |
| | ○ No – this is a replacing an existing requirement. |
| Work shift: | ○ 1st shift |
| | ○ 2nd shift |
| | ○ 3rd shift |
| | ○ 4th shift |
| Weekend coverage: | ☐ Weekend coverage is required. |
| On-call coverage may be required.: | ☐ On call coverage is required. |
| Travel: | ☐ Travel is required. |
| Will client assets be loaned ?: | ○ Assets will be made available. |
| | ○ Assets will not be made available. |

FIG. 3a

| Dates needed |
|---|

You must provide the start and end date and may additionally choose hours. (you may also provide an estimate of hours on the next screen.)

*Planned start date:   [11 ▽] [Nov ▽] [2006 ▽] ☐
*Planned end date:    [10 ▽] [Nov ▽] [2007 ▽] ☐
*Response due date:      ○  1 day (Urgent)
                         ○  2 days
                         ○  3 days
                         ⦿  Other [15 ▽] [Nov ▽] [2006 ▽]

| Additional terms |
|---|

Provide any additional terms tothe supplier.
Flowdown terms:          Flowdown terms. (You will need to contact the buyer.)

[Continue] [Save as draft] [Cancel]

| FIG. 3a |
|---|
| FIG. 3b |

FIG. 3

Skill detail for skill request

Complete the appropriate fields below and click "Continue" button
to proceed.                                                            304

| Address information |
|---|

Specify the location where the work will be performed.

Work will be performed at:    Company location
    Country/Territory                United States
    State/Region/Province:      California

* City: ▽     [SAN FRANCISCO ▽]
* Work location: ▽     [SAN FRANCISCO, 150 SPEAR STREET ▽]

[Previous] [Continue] [Save as draft]

Skill detail for skill request

Complete the appropriate fields below and click "Continue" button
to proceed.
Required fields are marked with an (*) and must be filled in to
complete the form.

| Address information |
|---|

Specify the location where the work will be performed.     504

* Work will be performed at:    Other (e.g., customer location,
                                             remote office, etc.)

Country/Territory           United States
* Address line 1:       [123 Main St]
  Address line 2:       [ ]

State/Region/Province:   California
* City: ▽    [SAN ANDREAS]
* Postel code: ▽    SAN ANDREAS ▽
                          SAN ANSELMO
                          SAN ARDO △

[Continue] [Save as draft] [Cancel]

Skill detail for skill request

Complete the appropriate fields below and click "Continue" button to proceed.

Required fields are marked with an (*) and must be filled in to complete the form.

Address information

Specify the location where the work will be performed.

| | |
|---|---|
| Work will be performed at | Other (e.g., customer location, remote office, etc) |
| Country/Territory | United States |
| * Address line 1: | 123 Main St |
| Address line 2: | |
| State/Region/Province | California |

604

| | |
|---|---|
| * City: ▽ | SANFRANCISCO |
| * Postel code: ▽ | 94080 |
| | 94080 ▽ |
| | 94083 |
| | 94100 |
| | 94101 |
| | 94102 |
| | 94103 △ |

[Prvious] [Continue] [Save as draft]

Skill detail for skill request

Submit request to supplers
___

Complete the appropriate fields below and click "Continue" button to proceed.
Required fields are marked with an (*) and must be filled in to complete the form.

| Supplier selection |

You may elect to send thisrequest to the primary suppliers in the region applicable to the resources or choose asubset of suppliers. You should discuss the request with your buyer prior to submitting to a supplier that is not listed.

Select the suppliers to whom this request should be sent: ▽
⦿ Send this skill request to primary suppliers listed below. If the primary suppliers cannot satisfy your request, then the request will be sent to other suppliers after X days. ▽    ▽

Primary supplier:
- WOI US TEST VENDOR 1
- WOI US Test Supplier 1
- WOI US Test Supplier 1

○ Send request to suppliers selected below. You must provide a business justification below if you choose to use this option.
   Select all | Deselect all
   ☑ WOI US TEST VENDOR 1
   ☑ WOI US Test Supplier 1
   ☑ WOI US Test Supplier 1

○ Utelize a supplier not listed above, details provided blow. You must provide a bussiness justification below if you choose this option.

* Supplier name: [          ]
* Contact name: [          ]
* Contact phone number: [          ] (Enter number and blanks only)
Address: [          ]
e-mail address: [          ]
First name: [          ]
Middle name: [          ]
Last name/surname: [          ]
Candidate phone number: [          ]
Currency: [USD ▽]
Estimated straight time rate: [     ] Per Hour
Estimated over time rate: [     ] Per Hour
Estimated double over time rate: [     ] Per Hour

| Additional comments |
Privide any additional comments to the supplier.
Comments to supplier: [          ]

[Privious] [Continue] [Save as draft]

MAPPING METHOD AND SYSTEM

FIELD OF THE INVENTION

The present invention relates to a method and associated system for associating work regions with suppliers of candidates.

BACKGROUND OF THE INVENTION

Selecting an agency for providing a suitable individual to perform functions typically requires a process that may be complicated and inaccurate. Accordingly, there exists a need in the art to overcome the deficiencies and limitations described herein above.

SUMMARY OF THE INVENTION

The present invention provides a mapping comprising:

receiving, by a computing system from a requester, a command for creating a candidate request, said computing system comprising a memory device, said memory device comprising, a list of candidate skills, a list of suppliers, a list of work regions, a list of geographical location identifiers, and a list of work locations, said requester associated with a first company;

associating, by said computing system, each work region of said list of work regions with a different group of work locations of said list of work locations;

associating, by said computing system, each said work region with a different group of geographical location identifiers of said list of geographical location identifiers;

associating, by said computing system, each said work region with a different group of suppliers of said list of suppliers;

presenting, by said computing system, said list of candidate skills to said requester;

receiving from said requester, by said computing system, a selection of a first candidate skill from said list of candidate skills;

receiving, from said requester by said computing system, a selection of a first work location of said list of work locations, said first work location associated with said first skill;

determining, by said computing system, a first geographical location identifier of said list of geographical location identifiers, said first geographical location identifier identifying a first area comprising said first work location;

determining, by said computing system, a first work region of said list of work regions, said first work region comprising said first area and said first work location;

selecting, by said computing system for said requester, a first group of suppliers of said list of suppliers, said first group of suppliers associated said first work region;

presenting, by said computing system to said requester, said first group of suppliers;

generating, by said computing system, a candidate request document, said candidate request document comprising said first candidate skill, said first work region, and said first work location; and transmitting, by said computing system to said first group of suppliers, said candidate request document.

The present invention provides a computing system comprising a processor coupled to a computer-readable memory unit, said memory unit comprising a list of candidate skills, a list of suppliers, a list of work regions, a list of geographical location identifiers, a list of work locations, and instructions that when executed by the processor implement a mapping method, said method comprising:

receiving, by said computing system from a requester, a command for creating a candidate request, said requester associated with a first company;

associating, by said computing system, each work region of said list of work regions with a different group of work locations of said list of work locations;

associating, by said computing system, each said work region with a different group of geographical location identifiers of said list of geographical location identifiers;

associating, by said computing system, each said work region with a different group of suppliers of said list of suppliers;

presenting, by said computing system, said list of candidate skills to said requester;

receiving from said requester, by said computing system, a selection of a first candidate skill from said list of candidate skills;

receiving, from said requester by said computing system, a selection of a first work location of said list of work locations, said first work location associated with said first skill;

determining, by said computing system, a first geographical location identifier of said list of geographical location identifiers, said first geographical location identifier identifying a first area comprising said first work location;

determining, by said computing system, a first work region of said list of work regions, said first work region comprising said first area and said first work location;

selecting, by said computing system for said requester, a first group of suppliers of said list of suppliers, said first group of suppliers associated said first work region;

presenting, by said computing system to said requester, said first group of suppliers;

generating, by said computing system, a candidate request document, said candidate request document comprising said first candidate skill, said first work region, and said first work location; and transmitting, by said computing system to said first group of suppliers, said candidate request document.

The present invention provides a computer program product, comprising a computer usable medium comprising a list of candidate skills, a list of suppliers, a list of work regions, a list of geographical location identifiers, a list of work locations, and a computer readable program code embodied therein, said computer readable program code adapted to implement a mapping method within a computing system, said method comprising:

receiving, by said computing system from a requester, a command for creating a candidate request, said requester associated with a first company;

associating, by said computing system, each work region of said list of work regions with a different group of work locations of said list of work locations;

associating, by said computing system, each said work region with a different group of geographical location identifiers of said list of geographical location identifiers;

associating, by said computing system, each said work region with a different group of suppliers of said list of suppliers;

presenting, by said computing system, said list of candidate skills to said requester;

receiving from said requester, by said computing system, a selection of a first candidate skill from said list of candidate skills;

receiving, from said requester by said computing system, a selection of a first work location of said list of work locations, said first work location associated with said first skill;

determining, by said computing system, a first geographical location identifier of said list of geographical location identifiers, said first geographical location identifier identifying a first area comprising said first work location;

determining, by said computing system, a first work region of said list of work regions, said first work region comprising said first area and said first work location;

selecting, by said computing system for said requester, a first group of suppliers of said list of suppliers, said first group of suppliers associated said first work region;

presenting, by said computing system to said requester, said first group of suppliers;

generating, by said computing system, a candidate request document, said candidate request document comprising said first candidate skill, said first work region, and said first work location; and transmitting, by said computing system to said first group of suppliers, said candidate request document.

The present invention provides a process for supporting computer infrastructure, said process comprising providing at least one support service for at least one of creating, integrating, hosting, maintaining, and deploying computer-readable code in a computing system comprising a memory unit, said memory unit comprising a list of candidate skills, a list of suppliers, a list of work regions, a list of geographical location identifiers, and a list of work locations, wherein the code in combination with the computing system is capable of performing a mapping method, said method comprising:

receiving, by said computing system from a requester, a command for creating a candidate request, said requester associated with a first company;

associating, by said computing system, each work region of said list of work regions with a different group of work locations of said list of work locations;

associating, by said computing system, each said work region with a different group of geographical location identifiers of said list of geographical location identifiers;

associating, by said computing system, each said work region with a different group of suppliers of said list of suppliers;

presenting, by said computing system, said list of candidate skills to said requester;

receiving from said requester, by said computing system, a selection of a first candidate skill from said list of candidate skills;

receiving, from said requester by said computing system, a selection of a first work location of said list of work locations, said first work location associated with said first skill;

determining, by said computing system, a first geographical location identifier of said list of geographical location identifiers, said first geographical location identifier identifying a first area comprising said first work location;

determining, by said computing system, a first work region of said list of work regions, said first work region comprising said first area and said first work location;

selecting, by said computing system for said requester, a first group of suppliers of said list of suppliers, said first group of suppliers associated said first work region;

presenting, by said computing system to said requester, said first group of suppliers;

generating, by said computing system, a candidate request document, said candidate request document comprising said first candidate skill, said first work region, and said first work location; and transmitting, by said computing system to said first group of suppliers, said candidate request document.

The present invention advantageously provides a method and associated system capable of selecting an agency for providing a suitable individual to perform functions.

BRIEF DESCRIPTION OF THE DRAWINGS

FIGS. 3a and 3b in combination illustrate an example of a computer screen shot associated with a first set of steps from the algorithm of FIG. 2, in accordance with embodiments of the present invention.

FIG. 4 illustrates an example of a computer screen shot section associated with a first step from the algorithm of FIG. 2, in accordance with embodiments of the present invention.

FIG. 5 illustrates an example of a computer screen shot section additionally associated with the first step from the algorithm of FIG. 2, in accordance with embodiments of the present invention.

FIG. 6 illustrates an example of a computer screen shot section further associated with the first step from the algorithm of FIG. 2, in accordance with embodiments of the present invention.

FIGS. 7a and 7b in combination illustrate an example of a computer screen shot associated with a second step from the algorithm of FIG. 2, in accordance with embodiments of the present invention.

DETAILED DESCRIPTION OF THE INVENTION

Figure 1:
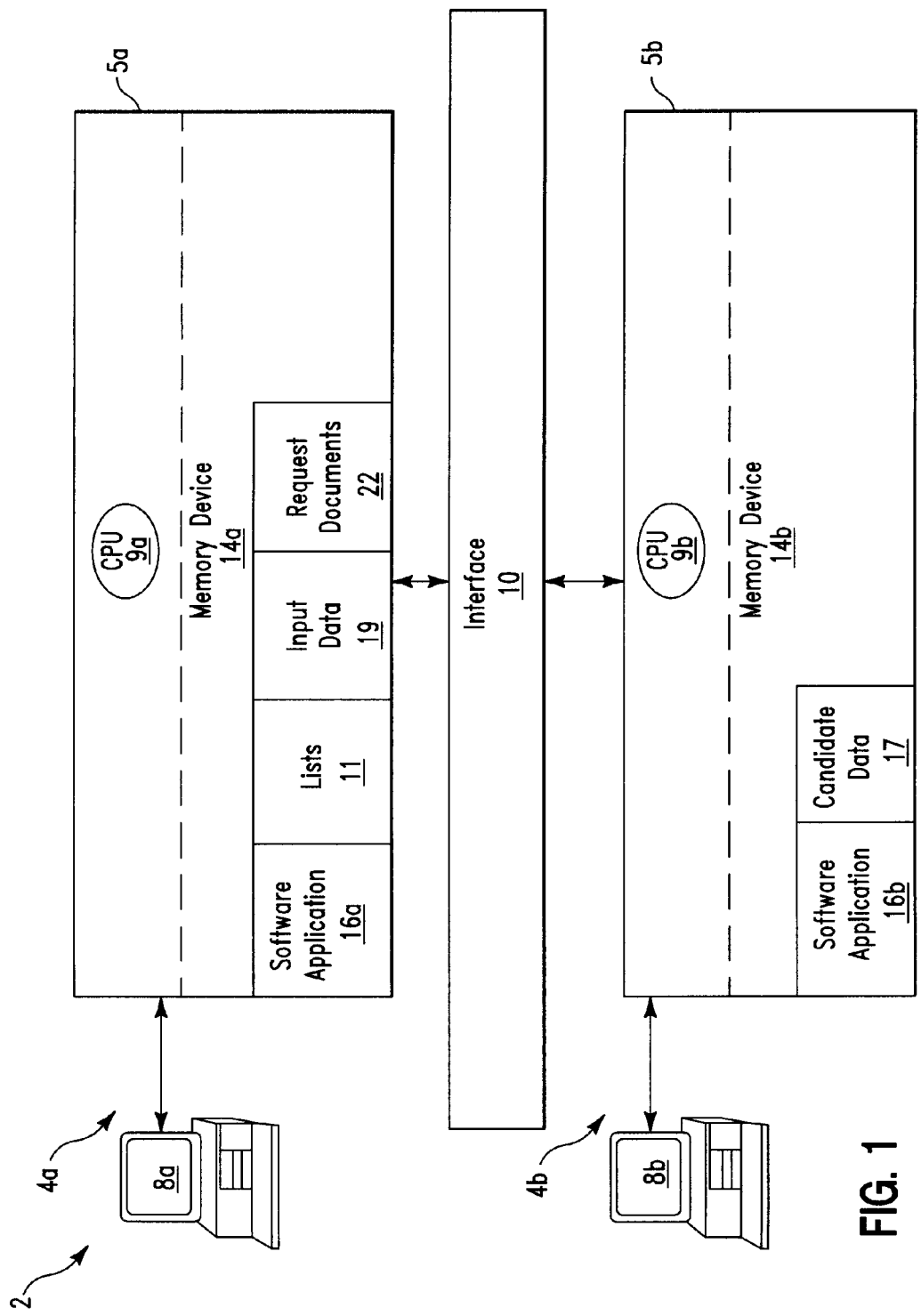
FIG. 1 illustrates a block diagram of a system for generating a candidate request and routing the candidate request to a plurality of associated suppliers, in accordance with embodiments of the present invention.

FIG. 1 illustrates a block diagram of a system 2 for generating a candidate request and routing the candidate request to a plurality of associated suppliers, in accordance with embodiments of the present invention. System 2 may be used for:

1. Generating associations between work locations, work regions, geographical location identifiers, suppliers, and pricing rates.

2. Allowing a user (e.g., a requester using terminal 8a) to select a work location (e.g., company location, customer location, remote location, etc) for a candidate (e.g., contractors, job applicants, etc) to perform a function comprising the selected skill or skill set.

3. Determining a geographical location (i.e., comprising a geographical location identifier such as, inter alia, a country name, a city name, a state name, a postal code, etc) comprising the work location.

4. Allowing a user (e.g., a requester using terminal 8a) to select a skill or skill set for generating a request for candidates (e.g., contractors, job applicants, etc) to perform a function comprising the selected skill or skill set.

5. Determining a work region comprising the work location by using the geographical location identifiers and a service type of the selected skill or skill set. A service type is a skill type classification (e.g., technical skills, administrative skills, educational skills, etc).
6. Providing a list of suppliers (e.g., employment agencies) within the work region.
7. Assigning pricing rates to the list of suppliers (i.e., rates paid to the suppliers for providing contractors).
8. Generating a request (including work region specific pricing) for candidates.
9. Sending the request to the suppliers on the list.

A requester is defined herein as a person/people (e.g., users from an entity such as, inter alia, a company) looking for a candidate or resource (i.e., a person/people with a specific skill(s)) to perform a function comprising a selected skill or skill set. A supplier is defined herein as an external entity or company (e.g., an employment agency) capable of satisfying candidate requests 9 (i.e., providing candidates). A work location is defined herein as a location where a candidate or resource will work (i.e., perform job duties). For example a work location may be a company location (e.g., a specific regional facility for a company), customer (i.e., for the company) location, remote/satellite company location, etc. A geographical location is defined herein as a geographical area that comprises a work location. For example, a geographical location may comprise a country, a city, a postal code etc. A geographical location identifier comprises an alpha/numeric identifier for the geographical location. For example, a geographical location identifier may comprise, inter alia, a country name, a city name, a state name, a postal code, etc. A work region is defined herein as a broad geographical area that may comprise a geographical location and several work locations. For example, a work region may comprise a multi-state area, a plurality of cities, etc. A software application (e.g., software application 16a) generates the associations between work locations, work regions, geographical location identifiers, suppliers, and pricing rates. The requester interacts with the software application (e.g., software application 16a) to select a work location and the software application determines the geographical location comprising the work location. The requester selects a specified candidate skill (e.g, a Java programmer, etc) to be performed in the work location and the software application determines a work region comprising the work location by using the geographical location identifiers and a service type of the selected skill or skill set. A service type is defined herein as a skill type classification (e.g., technical skills, administrative skills, educational skills, etc). The software application generates a list of suppliers (e.g., employment agencies) associated with the work region and assigns work region specific pricing rates to the list of suppliers (i.e., rates paid to the suppliers for providing contractors).

System 2 comprises a computing system 4a (e.g., a server) connected to a computing system 4b (e.g., a server) through an interface 10. Interface 10 may comprise any type of interface known to a person of ordinary skill in the art including, inter alia, a local area network, (LAN), a wide area network (WAN), the Internet, etc. Computing system 4a comprises a computing apparatus 5a and an interface terminal 8a. Computing system 4b comprises a computing apparatus 5b and an interface terminal 8b. Computing apparatus 5a comprises a CPU 9a and a memory device 14a. Alternatively, memory device 14a may be located external to computing apparatus 5a. Memory device 14a comprises a software application 16a, lists 11, input data 19, and request documents 22. Lists 11 and input data 19 may be inputted into computing apparatus 5a through interface terminal 8a. Computing apparatus 5b comprises a CPU 9b and a memory device 14b. Alternatively, memory device 14b may be located external to computing apparatus 5b. Candidate data 17 (i.e., comprising lists of candidates and responses from the suppliers) may be inputted into computing apparatus 5b through interface terminal 8b.

In order to initiate a process generating a candidate request and routing the candidate request to a plurality of associated suppliers a requester logs into computing system 5a. The following process steps illustrate an example of a process (i.e., using system 2) for a candidate request and routing the candidate request to a plurality of associated suppliers.
1. For a given project there is a need to hire candidates/resources with a given skill set. A project may be performed either in a company (i.e., requesting company) location or an alternative location such a customer location, temporary location, etc.
2. The requester logs in into software application 16a to create a request document for requested skills. In response, computing apparatus presents to the requester a template comprising questions. Using the template, the requester may select any type of request such as new, referral, or renewal and continue to input request details data (e.g., input data 19) such as, inter alia, project name, type of request, project coordinators, accounting information, etc.
3. The requester may additionally input skills details data (e.g., input data 19) such as, inter alia, a job role, job position details, dates, work location, etc. Generally, the requester has two options for a work location: a company location or other location.
  A. If the requester selects a company location, the requester will have the ability to filter a list of company facilities (i.e., from lists 11) by selecting a city, etc within the region.
  B. If the requester selects an other location (e.g. customer location, remote office, etc), the requester will have to provide specific address information such as street address line 1, street address line 2, postal code, and city. Software application 16a will suggest an appropriate name of city comprising the other location with a type ahead functionality. For example, the requester may only be required to know the first two letters of the city to trigger the type ahead functionality and select the more appropriate one.
4. The requester will select a primary skill or skill set (i.e., from lists 11) and a service type for the selected skill is determined.
5. The requester may select a level for the core skills and secondary skills may be added if needed
6. If requested skill is renewal or referral requester will provide candidate information.
7. If the selected skill set is a hot skill, the requester will have to provide competitive bid information.
8. The requester will either select a supplier where the company has agreements or provide the information of a new supplier.
  A. Computing system 4a will display to the requester, a list of suppliers close to the selected location. This is done by calculating a work region. Regardless of requester selection of the work location, computing system 4a may determine a work region given a country, region, city, postal code or work location.
  B. A company work location is may be attached to a given work location per country and service type.
  C. For an other location, there may be multiple combinations to obtain work regions since every country may have a different way to organize suppliers. For example, Germany may have only one single work region given the country policies while other countries such as, Canada, China, or France may have work regions configured by state/region/province or city, which may make the search more specific. The United States, France, and Canada may have some work regions by city or postal code dependent upon the amount of suppliers, government regulations, etc. In order to achieve this business requirement, an algorithm implemented by software application 16a is described as follows:

1. A work region may be located by using a service type, country, region, city, and postal code.
2. If there is no work region configured at that level (i.e., level 1), a work region may be located by using a service type, country, region, and city.
3. If there is no work region configured at that level (i.e., level 2), a work region may be located by using service type, country, region, and postal code.
4. If there is no work region configured at that level (i.e., level 3), a work region may be located by using service type, country, and region.
5. If there is no work region configured at that level (i.e., level 4), a work region may be located by using service type and country.

D. Once computing system 4a has calculated the work region, computing system 4a will be able to locate a corresponding pricing area, rates and suppliers configured so the requester may continue with request generation process.

9. Once the requester has finished, he/she may enable the generation of a request document.

Figure 2:
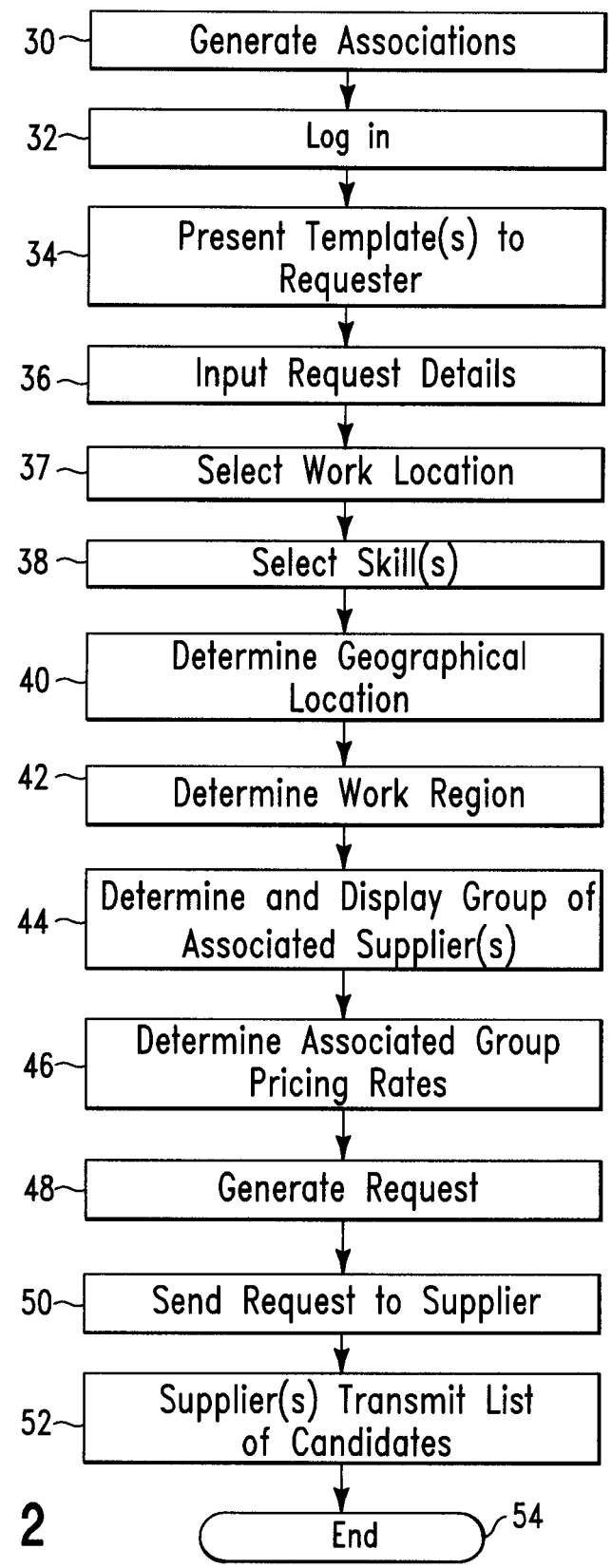
FIG. 2 illustrates a flowchart describing an algorithm used by the system of FIG. 1 for generating a candidate request and routing the candidate request to a plurality of associated suppliers.

FIG. 2 illustrates a flowchart describing an algorithm used by system 2 of FIG. 1 for generating a candidate request and routing the candidate request to a plurality of associated suppliers. In step 30, the computing system (e.g., computing system 4a in FIG. 1) generates associations between work locations, work regions, geographical location identifiers, suppliers, and pricing rates. In step 32, a requester logs into the computing system (e.g., computing system 4a of FIG. 1). In step 34, the computing system (e.g., computing system 4a in FIG. 1) presents the requester a request template (i.e., comprising questions) for generating a request document. In step 36, the requester inputs (i.e., via terminal 8a of FIG. 1) request details data into the computing system. In step 37, the requester selects a work location. In step 38, the requester is presented a list of skills and the requester selects a needed skill. In step 40, the computing system determines a geographical location for the work location. In step 42, the computing system determines a work region for the geographical location and the work location. In step 44, the work region determined in step 42 is used to generate an associated list of work region specific suppliers for providing resources for the work location. In step 46, a group of pricing rates for the suppliers is determined. In step 48, a request document (i.e., comprising the selected skill) is generated. In step 50, the request is transmitted to the suppliers determined in step 44. In step 52, the suppliers transmit lists of candidates and the process terminates in step 54.

An example for implementation of software application 16a for generating a candidate request and routing the candidate request to a plurality of associated suppliers is described as follows:

Computing system 4a has 436 cities configured in the United States. The cities are distributed among 12 different work regions as illustrated in table 1.

TABLE 1

| County | Work Region ID | Number of Regions | Number of Cities |
|---|---|---|---|
| USA | Boston | 3 | 94 |
| USA | California | 1 | 1 |
| USA | Chicago | 2 | 69 |
| USA | Hawaii | 1 | 8 |
| USA | New York City | 4 | 204 |
| USA | North Central | 14 | 14 |
| USA | North East | 10 | 10 |
| USA | Rochester, MN | 1 | 3 |
| USA | South Central | 7 | 7 |
| USA | South East | 10 | 11 |
| USA | Washington D.C. | 3 | 63 |
| USA | West | 8 | 8 |

The work location comprises the following address:
123 Main St
Essex Junction
Vermont 05452.
The work region configured in Vermont is illustrated in table 2.

TABLE 2

| County | Region | Work Region ID |
|---|---|---|
| USA | VT | Northeast |

Since the work region is only configured at region level, computing system 4a will perform four attempts in order to find a work region as illustrated below:
1. Find the work region by using US, VT, ESSEX JUNCTION and 05452.
2. Find the work region by using US, VT and ESSEX JUNCTION.
3. Find the work region by using US, VT and 05452.
4. Find the work region by using US, and VT.

Therefore, the resulting work region will be NORTH EAST. Once the work region is located, the work region will be used to determine a pricing area as illustrated in table 3.

TABLE 3

| Company ID | Country | Service type | Work Region | Area ID |
|---|---|---|---|---|
| Company A | USA | TSEN | Northeast | Area 2 |

A pricing area is used to determine a rate duration that will be used in the selected work location as illustrated in table 4.

TABLE 4

| Country | Pricing Area | Description |
|---|---|---|
| USA | Area 2 | Rates not established based on length of assignment |
| USA | Area 2 | Long term |
| USA | Area 2 | Medium term |
| USA | Area 2 | Short term |

Table 5 illustrates work region associated with suppliers for work locations.

TABLE 5

| Supplier ID | Company ID | Country | Service Type | Work Region |
|---|---|---|---|---|
| 1234A | Company A | USA | TSEN | Northeast |
| 1234B | Company A | USA | TSEN | Northeast |
| 1234C | Company A | USA | TSEN | Northeast |
| 1234D | Company A | USA | TSEN | Northeast |
| 1234E | Company A | USA | TSEN | Northeast |
| 1234F | Company A | USA | TSEN | Northeast |
| 1234G | Company A | USA | TSEN | Northeast |
| 1234H | Company A | USA | TSEN | Northeast |
| 1234I | Company A | USA | TSEN | Northeast |
| 1234J | Company A | USA | TSEN | Northeast |
| 1234K | Company A | USA | TSEN | Northeast |
| 1234L | Company A | USA | TSEN | Northeast |
| 1234M | Company A | USA | TSEN | Northeast |
| 1234N | Company A | USA | TSEN | Northeast |

FIGS. 3a and 3b in combination illustrate an example of a computer screen shot 300 (e.g., displayed on interface terminal 8a of FIG. 1) associated with steps 34, 36, and 37 of FIG. 2, in accordance with embodiments of the present invention. In FIG. 3, the computing system displays a work location selection section 304 of a computer screen shot 300 to allow a requester to specify work location. A company location or other location may be selected. The selection in selection portion 304 will populate the selection section 304 with valid states/regions/provinces related with a default country. In Global Resource requests, the country/territory field comprises a dropdown menu with valid countries where work locations have been configured.

FIG. 4 illustrates an example of a computer screen shot section 404 (e.g., displayed on interface terminal 8a of FIG. 1) associated with step 37 of FIG. 2, in accordance with embodiments of the present invention. In FIG. 4, the computing system displays a modified computer screen shot section 404 (i.e., modified from selection section 304 of FIG. 3) to allow company locations to be loaded by a bridge from a Real Estate/Site Operations database. The company locations are arranged by city, state/region/province and country/territory. Since the country and state are selected in selection section 304 of FIG. 3, a city field is populated with all cities that have at least one company location in that given state and country. Countries like USA or Japan may have hundreds of locations spread among their different states. Software application 16a uses a type ahead functionality so that the work location dropdown menu populated by only looking for work locations that match the selected country, state and city.

FIG. 5 illustrates an example of a computer screen shot section 504 (e.g., displayed on interface terminal 8a of FIG. 1) associated with step 37 of FIG. 2, in accordance with embodiments of the present invention. In FIG. 5, the computing system displays a modified computer screen shot section 504 (i.e., modified from selection section 304 of FIG. 3) to allow non-company work locations (i.e., other work locations) to be selected. When the requester selects other location, the complete address information must be collected from the requester. Address line 1 and address line 2 are used to specify a street name and number, apartment number, building, etc. The city may be entered as a free type text where the requester may specify a name of the city (e.g., using a keyboard). If the requester types more than 2 letters of a city, computing system 4a will suggest all possible cities that match the two or more letters typed by the requester.

FIG. 6 illustrates an example of a computer screen shot section 604 (e.g., displayed on interface terminal 8a of FIG. 1) associated with step 37 of FIG. 2, in accordance with embodiments of the present invention. In FIG. 6, the computing system displays a modified computer screen shot section 604 (i.e., modified from selection section 304 of FIG. 3) to allow software application to adapt given a country configuration. For some countries, it might be required to enter a valid postal code in order to find appropriate pricing rates or suppliers. The requester has two options:
1. Start typing a postal code.
2. Use a dropdown button to pick a closest postal code.

FIGS. 7a and 7b in combination illustrate an example of a computer screen shot 700 (e.g., displayed on interface terminal 8a of FIG. 1) associated with step 44 of FIG. 2, in accordance with embodiments of the present invention. In FIG. 7, the computing system displays a screen shot section 704 comprising the associated (i.e., associated with the work region) suppliers.

Figure 8:
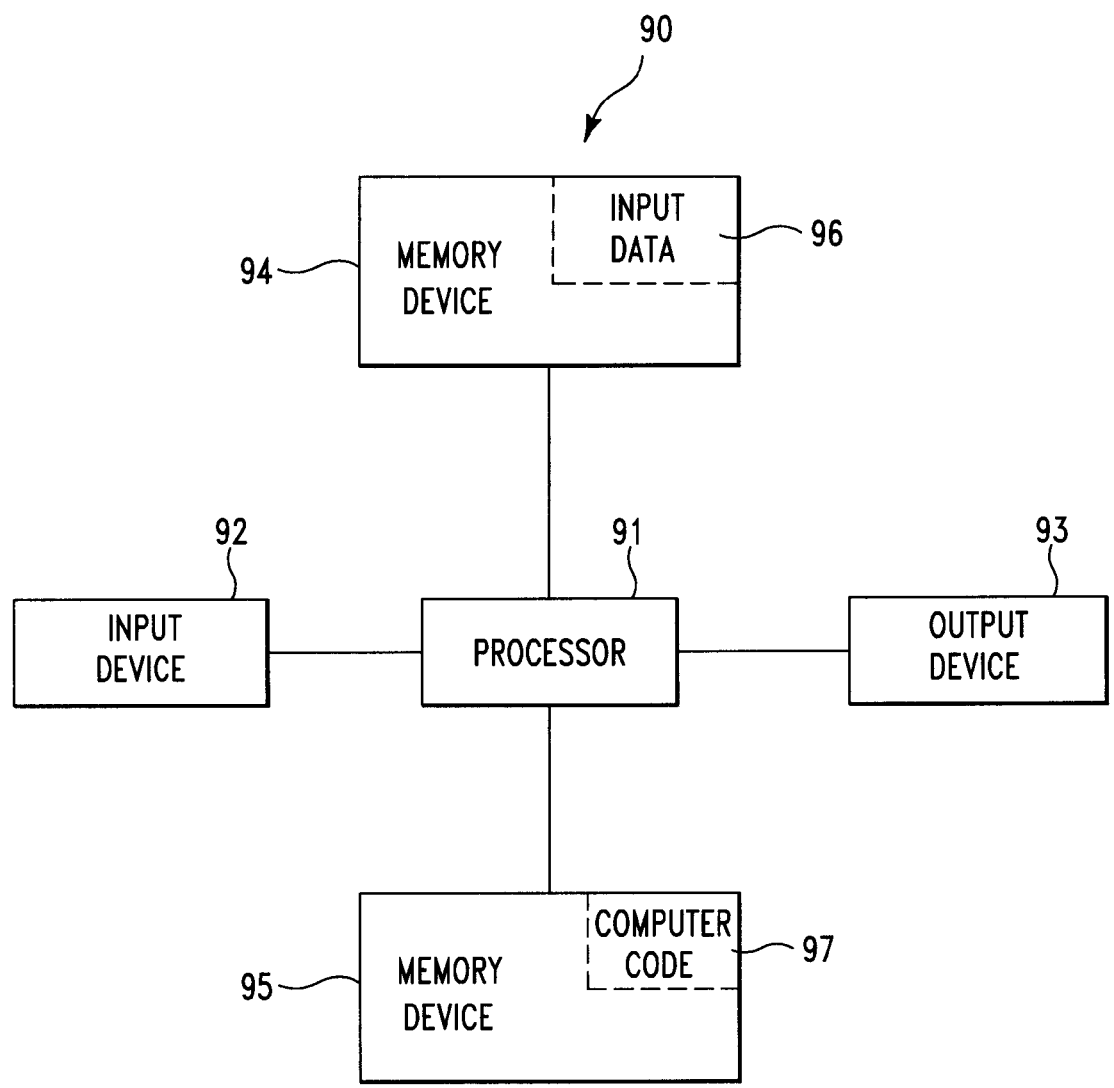
FIG. 8 illustrates a computer system used for generating a candidate request and routing the candidate request to a plurality of associated suppliers, in accordance with embodiments of the present invention.

FIG. 8 illustrates a computer system 90 (i.e., computing system 4a and/or 4b in FIG. 1) used for generating a candidate request and routing the candidate request to a plurality of associated suppliers, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for generating a candidate request and routing the candidate request to a plurality of associated suppliers. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to generate a modified request document. Thus the present invention discloses a process for deploying or integrating computing infrastructure, comprising integrating computer-readable code into the computer system 90, wherein the code in combination with the computer system 90 is capable of performing a method for generating a candidate request and routing the candidate request to a plurality of associated suppliers. In another embodiment, the invention provides a business method that performs the process steps of the invention on a subscription, advertising, and/or fee basis. That is, a service provider, such as a Solution Integrator, could offer to generate a candidate request and route the candidate request to a plurality of associated suppliers. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A mapping method, comprising:
  receiving, by a computing system from a requester, a command for creating a candidate request, said computing system comprising a memory device, said memory device comprising, a list of candidate skills, a list of suppliers, a list of work regions, a list of geographical location identifiers, and a list of work locations, said requester associated with a first company;
  associating, by said computing system, each work region of said list of work regions with a different group of work locations of said list of work locations;
  associating, by said computing system, each said work region with a different group of geographical location identifiers of said list of geographical location identifiers;
  associating, by said computing system, each said work region with a different group of suppliers of said list of suppliers;
  determining, by a computer processor of said computing system based on associated work regions of said work regions selected from a table, pricing areas used to determine rate durations associated with time periods for implementing supplier pricing rates used for selected work locations, wherein said rate durations comprise differing rate durations including a short term duration, a medium term duration, and a short term duration;
  presenting, by said computing system, a skills template to said requester, wherein said skills template consists of: said list of candidate skills; selections for selecting primary job categories; selections for selecting secondary job categories consisting of subcategories of said primary job categories; selections for selecting candidate skills of said list of candidate skills; selections for selecting position details consisting of: a first, second, third or fourth work shift, weekend coverage, and on-call coverage; selections for travel requirements; selections for loaned client assets; and selections for selecting a planned start date, a planned end date, and a response due date;
  receiving from said requester, by said computing system, a selection of a first candidate skill from said list of candidate skills;
  receiving, from said requester by said computing system, a selection of a first work location of said list of work locations, said first work location associated with a first pricing area of said pricing areas, a first rate duration of said rate durations, and said first skill;
  determining, by said computing system, a first geographical location identifier of said list of geographical location identifiers, said first geographical location identifier identifying a first area comprising said first work location;
  determining, by said computing system, a first work region of said list of work regions, said first work region comprising said first area and said first work location;
  after a specified time period, selecting, by said computing system for said requester, a first group of suppliers of said list of suppliers, said first group of suppliers associated said first work region, said first group of suppliers consisting of secondary suppliers selected as a result of primary suppliers being unable to satisfy a job category request;
  presenting, by said computing system to said requester, said first group of suppliers;
  receiving, by said computing system, a first selection for a first primary job category of said primary job categories;
  receiving, by said computing system, a second selection for a first secondary job category of said secondary job categories;
  receiving, by said computing system, a third selection for a first position detail of said position details, said first position detail consisting of a first work shift, first week end coverage, and first on-call coverage;
  receiving, by said computing system, a fourth selection consisting of a first planned start date, a first planned end date, and a first planned response due date for candidate selection;
  generating, by said computing system, a candidate request document, said candidate request document comprising said first selection, said second selection, said third selection, said fourth selection, said first candidate skill, said first work region, and said first work location; and
  transmitting, by said computing system to said first group of suppliers, said candidate request document.

2. The method of claim 1, wherein said memory device further comprises a list of pricing rates associated with said list of suppliers, and wherein said method further comprises:
  associating, by said computing system, each said work region with a different group of pricing rates of said list of pricing rates; and
  selecting, by said computing system for said requester, a first group of pricing rates of said list of pricing rates, wherein said first group of pricing rates is associated with said first work region and said first group of suppliers, and wherein said request document further comprises said first group of pricing rates.

3. The method of claim 1, wherein each geographical location identifier of said list of geographical location identifiers comprises a plurality of alphanumeric characters, and wherein said method further comprises:
  receiving, from said requester by said computing system, input data comprising a first alphanumeric character, wherein said determining said first geographical location identifier comprises matching said first alphanumeric character to a second same alphanumeric character comprised by said first geographical identifier and displaying a group of geographical identifiers of said list of geographical location identifiers comprising said second same alphanumeric character, and wherein said group of geographical identifiers comprises said first geographical identifier.

4. The method of claim 1, wherein said memory device further comprises a list of service type identifiers identifying service types for each candidate skill of said list of candidate skills, and wherein said method further comprises:
- determining, by said computing system, a first service type identifier of said list of service type identifiers, wherein said first service type identifier identifies a first service type for said first candidate skill; and
- determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, a specified city, and a specified postal code, and wherein said determining said first work region comprises using said first service type identifier, said specified country, said specified region, said specified city, and said specified postal code.

5. The method of claim 1, wherein said memory device further comprises a list of service type identifiers identifying service types for each candidate skill of said list of candidate skills, and wherein said method further comprises:
- determining, by said computing system, a first service type identifier of said list of service type identifiers, wherein said first service type identifier identifies a first service type for said first candidate skill; and
- determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, and a specified city, and wherein said determining said first work region comprises using said first service type identifier, said specified country, said specified region, and said specified city.

6. The method of claim 1, wherein said memory device further comprises a list of service type identifiers identifying service types for each candidate skill of said list of candidate skills, and wherein said method further comprises:
- determining, by said computing system, a first service type identifier of said list of service type identifiers, wherein said first service type identifier identifies a first service type for said first candidate skill; and
- determining, by said computing system, a plurality of geographical location identifiers of said list of geographical location identifiers, each geographical location identifier of said plurality of geographical location identifiers associated with said first work location, wherein said first geographical location identifier comprise a specified country, wherein said plurality of geographical location identifiers comprises a specified region and a specified postal code, and wherein said determining said first work region comprises using said first service type identifier, said specified country, said specified region, and said specified postal code.

7. The method of claim 1, wherein said memory device further comprises a list of service type identifiers identifying service types for each candidate skill of said list of candidate skills, and wherein said method further comprises:
- determining, by said computing system, a first service type identifier of said list of service type identifiers, wherein said first service type identifier identifies a first service type for said first candidate skill; and
- determining, by said computing system, a second geographical location identifier of said list of geographical location identifiers, said second geographical location identifier associated with said first work location, wherein said first geographical location identifier comprises a specified country, wherein said second geographical location identifier comprises a specified region, and wherein said determining said first work region comprises using said first service type identifier, said specified country, and said specified region.

8. The method of claim 1, wherein said memory device further comprises a list of service type identifiers identifying service types for each candidate skill of said list of candidate skills, and wherein said method further comprises:
- determining, by said computing system, a first service type identifier of said list of service type identifiers, wherein said first service type identifier identifies a first service type for said first candidate skill, wherein said first geographical location identifier comprises a specified country, and wherein said determining said first work region comprises using said first service type identifier and said specified country.

9. The method of claim 1, wherein said first work location comprises an onsite location for said first company.

10. The method of claim 1, wherein said first work location comprises a customer location associated with said first company.

11. A computing system comprising a computer processor coupled to a computer-readable memory unit, said memory unit comprising a list of candidate skills, a list of suppliers, a list of work regions, a list of geographical location identifiers, a list of work locations, and instructions that when executed by the computer processor implement a mapping method, said method comprising:
- receiving, by said computing system from a requester, a command for creating a candidate request, said requester associated with a first company;
- associating, by said computing system, each work region of said list of work regions with a different group of work locations of said list of work locations;
- associating, by said computing system, each said work region with a different group of geographical location identifiers of said list of geographical location identifiers;
- associating, by said computing system, each said work region with a different group of suppliers of said list of suppliers;
- determining, by said computer processor, based on associated work regions of said work regions selected from a table, pricing areas used to determine rate durations associated with time periods for implementing supplier pricing rates used for selected work locations, wherein said rate durations comprise differing rate durations including a short term duration, a medium term duration, and a short term duration;
- presenting, by said computing system, a skills template to said requester, wherein said skills template consists of: said list of candidate skills; selections for selecting primary job categories; selections for selecting secondary job categories consisting of subcategories of said primary job categories; selections for selecting candidate skills of said list of candidate skills; selections for selecting position details consisting of: a first, second, third or fourth work shift, weekend coverage, and on-call coverage; selections for travel requirements; selections for loaned client assets; and selections for selecting a planned start date, a planned end date, and a response due date;

receiving from said requester, by said computing system, a selection of a first candidate skill from said list of candidate skills;

receiving, from said requester by said computing system, a selection of a first work location of said list of work locations, said first work location associated with a first pricing area of said pricing areas, a first rate duration of said rate durations, and said first skill;

determining, by said computing system, a first geographical location identifier of said list of geographical location identifiers, said first geographical location identifier identifying a first area comprising said first work location;

determining, by said computing system, a first work region of said list of work regions, said first work region comprising said first area and said first work location;

after a specified time period, selecting, by said computing system for said requester, a first group of suppliers of said list of suppliers, said first group of suppliers associated said first work region, said first group of suppliers consisting of secondary suppliers selected as a result of primary suppliers being unable to satisfy a job category request;

presenting, by said computing system to said requester, said first group of suppliers;

receiving, by said computing system, a first selection for a first primary job category of said primary job categories;

receiving, by said computing system, a second selection for a first secondary job category of said secondary job categories;

receiving, by said computing system, a third selection for a first position detail of said position details, said first position detail consisting of a first work shift, first week end coverage, and first on-call coverage;

receiving, by said computing system, a fourth selection consisting of a first planned start date, a first planned end date, and a first planned response due date for candidate selection;

generating, by said computing system, a candidate request document, said candidate request document comprising said first selection, said second selection, said third selection, said fourth selection, said first candidate skill, said first work region, and said first work location; and transmitting, by said computing system to said first group of suppliers, said candidate request document.

12. The computing system of claim 11, wherein said memory unit further comprises a list of pricing rates associated with said list of suppliers, and wherein said method further comprises:

associating, by said computing system, each said work region with a different group of pricing rates of said list of pricing rates; and selecting, by said computing system for said requester, a first group of pricing rates of said list of pricing rates, wherein said first group of pricing rates is associated with said first work region and said first group of suppliers, and wherein said request document further comprises said first group of pricing rates.

13. The computing system of claim 11, wherein each geographical location identifier of said list of geographical location identifiers comprises a plurality of alphanumeric characters, and wherein said method further comprises:

receiving, from said requester by said computing system, input data comprising a first alphanumeric character, wherein said determining said first geographical location identifier comprises matching said first alphanumeric character to a second same alphanumeric character comprised by said first geographical identifier and displaying a group of geographical identifiers of said list of geographical location identifiers comprising said second same alphanumeric character, and wherein said group of geographical identifiers comprises said first geographical identifier.

14. The computing system of claim 11, wherein said memory unit further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, a specified city, and a specified postal code, and wherein said determining said first work region comprises using said first service type identifier, said specified country, said specified region, said specified city, and said specified postal code.

15. The computing system of claim 11, wherein said memory unit further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, and a specified city, and wherein said determining said first work region comprises using said first service type identifier, said specified country, said specified region, and said specified city.

16. The computing system of claim 11, wherein said memory unit further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprise a specified country, wherein said plurality of geographical location identifiers comprises a specified region and a specified postal code, and wherein said determining said first work region comprises using said first service type identifier, said specified country, said specified region, and said specified postal code.

17. The computing system of claim 11, wherein said memory unit further comprises a list of service type identifiers identifying service types for each candidate skill of said list of candidate skills, and wherein said method further comprises:
determining, by said computing system, a first service type identifier of said list of service type identifiers, wherein said first service type identifier identifies a first service type for said first candidate skill; and
determining, by said computing system, a second geographical location identifier of said list of geographical location identifiers, said second geographical location identifier associated with said first work location, wherein said first geographical location identifier comprises a specified country, wherein said second geographical location identifier comprises a specified region, and wherein said determining said first work region comprises using said first service type identifier, said specified country, and said specified region.

18. The computing system of claim 11, wherein said memory unit further comprises a list of service type identifiers identifying service types for each candidate skill of said list of candidate skills, and wherein said method further comprises:
determining, by said computing system, a first service type identifier of said list of service type identifiers, wherein said first service type identifier identifies a first service type for said first candidate skill, wherein said first geographical location identifier comprises a specified country, and wherein said determining said first work region comprises using said first service type identifier and said specified country.

19. The computing system of claim 11, wherein said first work location comprises an onsite location for said first company.

20. The computing system of claim 11, wherein said first work location comprises a customer location associated with said first company.

21. A computer program product, comprising a computer readable storage device storing a list of candidate skills, a list of suppliers, a list of work regions, a list of geographical location identifiers, a list of work locations, and a computer readable program code, said computer readable program code adapted to implement a mapping method within a computing system, said method comprising:
receiving, by said computing system from a requester, a command for creating a candidate request, said requester associated with a first company;
associating, by said computing system, each work region of said list of work regions with a different group of work locations of said list of work locations;
associating, by said computing system, each said work region with a different group of geographical location identifiers of said list of geographical location identifiers;
associating, by said computing system, each said work region with a different group of suppliers of said list of suppliers;
determining, by a computer processor of said computing system based on associated work regions of said work regions selected from a table, pricing areas used to determine rate durations associated with time periods for implementing supplier pricing rates used for selected work locations, wherein said rate durations comprise differing rate durations including a short term duration, a medium term duration, and a short term duration;
presenting, by said computing system, a skills template to said requester, wherein said skills template consists of: said list of candidate skills; selections for selecting primary job categories; selections for selecting secondary job categories consisting of subcategories of said primary job categories; selections for selecting candidate skills of said list of candidate skills; selections for selecting position details consisting of: a first, second, third or fourth work shift, weekend coverage, and on-call coverage; selections for travel requirements; selections for loaned client assets; and selections for selecting a planned start date, a planned end date, and a response due date;
receiving from said requester, by said computing system, a selection of a first candidate skill from said list of candidate skills;
receiving, from said requester by said computing system, a selection of a first work location of said list of work locations, said first work location associated with a first pricing area of said pricing areas, a first rate duration of said rate durations, and said first skill;
determining, by said computing system, a first geographical location identifier of said list of geographical location identifiers, said first geographical location identifier identifying a first area comprising said first work location;
determining, by said computing system, a first work region of said list of work regions, said first work region comprising said first area and said first work location;
after a specified time period, selecting, by said computing system for said requester, a first group of suppliers of said list of suppliers, said first group of suppliers associated said first work region, said first group of suppliers consisting of secondary suppliers selected as a result of primary suppliers being unable to satisfy a job category request;
presenting, by said computing system to said requester, said first group of suppliers;
receiving, by said computing system, a first selection for a first primary job category of said primary job categories;
receiving, by said computing system, a second selection for a first secondary job category of said secondary job categories;
receiving, by said computing system, a third selection for a first position detail of said position details, said first position detail consisting of a first work shift, first weekend coverage, and first on-call coverage;
receiving, by said computing system, a fourth selection consisting of a first planned start date, a first planned end date, and a first planned response due date for candidate selection;
generating, by said computing system, a candidate request document, said candidate request document comprising said first selection, said second selection, said third selection, said fourth selection, said first candidate skill, said first work region, and said first work location; and
transmitting, by said computing system to said first group of suppliers, said candidate request document.

22. The computer program product of claim 21, wherein said computer usable medium further comprises a list of pricing rates associated with said list of suppliers, and wherein said method further comprises:

associating, by said computing system, each said work region with a different group of pricing rates of said list of pricing rates; and selecting, by said computing system for said requester, a first group of pricing rates of said list of pricing rates, wherein said first group of pricing rates is associated with said first work region and said first group of suppliers, and wherein said request document further comprises said first group of pricing rates.

23. The computer program product of claim 21, wherein each geographical location identifier of said list of geographical location identifiers comprises a plurality of alphanumeric characters, and wherein said method further comprises:

receiving, from said requester by said computing system, input data comprising a first alphanumeric character, wherein said determining said first geographical location identifier comprises matching said first alphanumeric character to a second same alphanumeric character comprised by said first geographical identifier and displaying a group of geographical identifiers of said list of geographical location identifiers comprising said second same alphanumeric character, and wherein said group of geographical identifiers comprises said first geographical identifier.

24. The computer program product of claim 21, wherein said computer usable medium further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, a specified city, and a specified postal code, and wherein said determining said first work region comprises using said first service type identifier, said specified country, said specified region, said specified city, and said specified postal code.

25. The computer program product of claim 21, wherein said computer usable medium further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, and a specified city, and wherein said determining said first work region comprises using said first service type identifier, said specified country, said specified region, and said specified city.

26. The computer program product of claim 21, wherein said computer usable medium further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprise a specified country, wherein said plurality of geographical location identifiers comprises a specified region and a specified postal code, and wherein said determining said first work region comprises using said first service type identifier, said specified country, said specified region, and said specified postal code.

27. The computer program product of claim 21, wherein said computer usable medium further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a second geographical location identifier of said list of geographical location identifiers, said second geographical location identifier associated with said first work location, wherein said first geographical location identifier comprises a specified country, wherein said second geographical location identifier comprises a specified region, and wherein said determining said first work region comprises using said first service type identifier, said specified country, and said specified region.

28. The computer program product of claim 21, wherein said computer usable medium further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill, wherein said first geographical location identifier comprises a specified country, and wherein said determining said first work region comprises using said first service type identifier and said specified country.

29. The computer program product of claim 21, wherein said first work location comprises an onsite location for said first company.

30. The computer program product of claim 21, wherein said first work location comprises a customer location associated with said first company.

31. A process for supporting computer infrastructure, said process comprising providing at least one support service for at least one of creating, integrating, hosting, maintaining, and deploying computer-readable code in a computing system comprising a memory unit, said memory unit comprising a list of candidate skills, a list of suppliers, a list of work regions, a list of geographical location identifiers, and a list of work locations, wherein the code in combination with the computing system is capable of performing a mapping method, said method comprising:

receiving, by said computing system from a requester, a command for creating a candidate request, said requester associated with a first company;

associating, by said computing system, each work region of said list of work regions with a different group of work locations of said list of work locations;

associating, by said computing system, each said work region with a different group of geographical location identifiers of said list of geographical location identifiers;

associating, by said computing system, each said work region with a different group of suppliers of said list of suppliers;

determining, by a computer processor of said computing system based on associated work regions of said work regions selected from a table, pricing areas used to determine rate durations associated with time periods for implementing supplier pricing rates used for selected work locations, wherein said rate durations comprise differing rate durations including a short term duration, a medium term duration, and a short term duration;

presenting, by said computing system, a skills template to said requester, wherein said skills template consists of: said list of candidate skills; selections for selecting primary job categories; selections for selecting secondary job categories consisting of subcategories of said primary job categories; selections for selecting candidate skills of said list of candidate skills; selections for selecting position details consisting of: a first, second, third or fourth work shift, weekend coverage, and on-call coverage; selections for travel requirements; selections for loaned client assets; and selections for selecting a planned start date, a planned end date, and a response due date;

receiving from said requester, by said computing system, a selection of a first candidate skill from said list of candidate skills;

receiving, from said requester by said computing system, a selection of a first work location of said list of work locations, said first work location associated with a first pricing area of said pricing areas, a first rate duration of said rate durations, and said first skill;

determining, by said computing system, a first geographical location identifier of said list of geographical location identifiers, said first geographical location identifier identifying a first area comprising said first work location;

determining, by said computing system, a first work region of said list of work regions, said first work region comprising said first area and said first work location;

after a specified time period, selecting, by said computing system for said requester, a first group of suppliers of said list of suppliers, said first group of suppliers associated said first work region, said first group of suppliers consisting of secondary suppliers selected as a result of primary suppliers being unable to satisfy a job category request;

presenting, by said computing system to said requester, said first group of suppliers;

receiving, by said computing system, a first selection for a first primary job category of said primary job categories;

receiving, by said computing system, a second selection for a first secondary job category of said secondary job categories;

receiving, by said computing system, a third selection for a first position detail of said position details, said first position detail consisting of a first work shift, first week end coverage, and first on-call coverage;

receiving, by said computing system, a fourth selection consisting of a first planned start date, a first planned end date, and a first planned response due date for candidate selection;

generating, by said computing system, a candidate request document, said candidate request document comprising said first selection, said second selection, said third selection, said fourth selection, said first candidate skill, said first work region, and said first work location; and transmitting, by said computing system to said first group of suppliers, said candidate request document.

32. The process of claim 31, wherein said memory device further comprises a list of pricing rates associated with said list of suppliers, and wherein said method further comprises:

associating, by said computing system, each said work region with a different group of pricing rates of said list of pricing rates; and selecting, by said computing system for said requester, a first group of pricing rates of said list of pricing rates, wherein said first group of pricing rates is associated with said first work region and said first group of suppliers, and wherein said request document further comprises said first group of pricing rates.

33. The process of claim 31, wherein each geographical location identifier of said list of geographical location identifiers comprises a plurality of alphanumeric characters, and wherein said method further comprises:

receiving, from said requester by said computing system, input data comprising a first alphanumeric character, wherein said determining said first geographical location identifier comprises matching said first alphanumeric character to a second same alphanumeric character comprised by said first geographical identifier and displaying a group of geographical identifiers of said list of geographical location identifiers comprising said second same alphanumeric character, and wherein said group of geographical identifiers comprises said first geographical identifier.

34. The process of claim 31, wherein said memory device further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, a specified city, and a specified postal code, and wherein said determining said first work region comprises using said first service type identifier, said specified country, said specified region, said specified city, and said specified postal code.

35. The process of claim 31, wherein said memory device further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprises a specified country, wherein said plurality of geographical location identifiers comprise a specified region, and a specified city, and wherein said determining said first work region comprises using said first service type identifier, said specified country, said specified region, and said specified city.

36. The process of claim 31, wherein said memory device further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a plurality of geographical location identifiers of said list of geographical location identifiers, each geographical location identifier of said plurality of geographical location identifiers associated with said first work location, wherein said first geographical location identifier comprise a specified country, wherein said plurality of geographical location identifiers comprises a specified region and a specified postal code, and wherein said determining said first work region comprises using said first service type identifier, said specified country, said specified region, and said specified postal code.

37. The process of claim 31, wherein said memory device further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill; and determining, by said computing system, a second geographical location identifier of said list of geographical location identifiers, said second geographical location identifier associated with said first work location, wherein said first geographical location identifier comprises a specified country, wherein said second geographical location identifier comprises a specified region, and wherein said determining said first work region comprises using said first service type identifier, said specified country, and said specified region.

38. The process of claim 31, wherein said memory device further comprises a list of service type identifiers identifying service types for each candidate skill of said list of candidate skills, and wherein said method further comprises:

determining, by said computing system, a first service type identifier of said list of service type identifiers, wherein said first service type identifier identifies a first service type for said first candidate skill, wherein said first geographical location identifier comprises a specified country, and wherein said determining said first work region comprises using said first service type identifier and said specified country.

39. The process of claim 31, wherein said first work location comprises an onsite location for said first company.

40. The process of claim 31, wherein said first work location comprises a customer location associated with said first company.

* * * * *